United States Patent [19]
Hamada et al.

[11] Patent Number: 5,609,703
[45] Date of Patent: Mar. 11, 1997

[54] PROCESS FOR PREPARING THERMOPLASTIC ELASTOMER LAMINATES

[75] Inventors: Shun-ichi Hamada; Akira Uchiyama; Shizuo Shimizu, all of Ichihara, Japan

[73] Assignee: Mitsui Petrochemical Industries, Ltd., Tokyo, Japan

[21] Appl. No.: 412,515

[22] Filed: Mar. 27, 1995

Related U.S. Application Data

[63] Continuation of Ser. No. 124,853, Sep. 22, 1993, abandoned, which is a continuation of Ser. No. 895,451, Jun. 8, 1992, abandoned, which is a continuation of Ser. No. 409,318, Sep. 19, 1989, abandoned.

[30] Foreign Application Priority Data

Sep. 22, 1988 [JP] Japan .................................. 63-238431

[51] Int. Cl.$^6$ ...................................... B32B 5/18
[52] U.S. Cl. .................... 156/79; 156/214; 156/222; 156/309.6; 156/309.9; 264/46.4; 264/415; 428/318.6
[58] Field of Search .............................. 156/78, 79, 212, 156/214, 222, 224, 309.3, 309.6, 309.9; 296/211, 214; 428/316.6, 318.6; 264/46.4, 415

[56] References Cited

U.S. PATENT DOCUMENTS

| | | | |
|---|---|---|---|
| Re. 31,882 | 5/1985 | Moskovich | 141/5 |
| 3,717,559 | 2/1973 | Oyama et al. | 521/143 X |
| 3,965,054 | 6/1976 | Nojiri et al. | 521/140 X |
| 4,097,319 | 6/1978 | Shimokawa et al. | 156/79 |
| 4,499,210 | 2/1985 | Senuma et al. | 521/143 X |
| 4,680,317 | 7/1987 | Kuhnel et al. | 521/140 X |
| 4,696,709 | 9/1987 | Hargarten et al. | 156/79 |
| 4,719,039 | 1/1988 | Leonardi | 264/DIG. 18 X |
| 4,731,279 | 3/1988 | Isshiki | 52/309.9 X |
| 4,997,707 | 3/1991 | Otawa et al. | 156/285 X |

FOREIGN PATENT DOCUMENTS

| | | |
|---|---|---|
| 203399 | 7/1988 | European Pat. Off. . |
| 7242949 | 10/1972 | Japan . |
| 1044286 | 9/1966 | United Kingdom . |
| 1210637 | 10/1970 | United Kingdom . |
| 8805520 | 9/1988 | WIPO . |

*Primary Examiner*—Mark A. Osele
*Attorney, Agent, or Firm*—Birch, Stewart, Kolasch & Birch, LLP

[57] ABSTRACT

In accordance with the present invention, there is provided a process for preparing thermoplastic elastomer laminates which comprises placing a thermoplastic elastomer foamable sheet in an unexpanded state containing a polyolefin resin, an ethylene/α-olefin copolymer rubber and a foaming agent onto the back of a thermoplastic elastomer sheet containing a polyolefin resin and an ethylene/α-olefin copolymer rubber, heat fusion bonding both sheets to each other, and heating the resulting laminated sheet to expand the thermoplastic elastomer sheet containing the foaming agent.

15 Claims, No Drawings

PROCESS FOR PREPARING THERMOPLASTIC ELASTOMER LAMINATES

This application is a continuation of application Ser. No. 08/124,853, filed on Sep. 22, 1993, now abandoned which is a continuation of application Ser. No. 07/895,451, filed Jun. 8, 1992, now abandoned, which is a continuation of application Ser. No. 07/409,318, filed Sep. 19, 1989, now abandoned.

BACKGROUND OF THE INVENTION

1. Field of the Invention

This invention relates to a process for preparing thermoplastic elastomer laminates and more particularly to processes for preparing soft thermoplastic elastomer laminates having a thin thermoplastic elastomer foamed layer, the laminates being useful for applications as outer skin materials in automotive internal trim parts, such as instrument panels and interior sheets, and in outer skin materials for the air bag.

2. Description of the Prior Art

Thermoplastic elastomers have been widely used heretofore as outer skin materials for automotive internal trim and parts, for example, instrument panels and interior sheets. The thermoplastic elastomers possess properties such as both thermoplasticity and elasticity, and can be formed by injection molding, extrusion molding or the like into molded articles having excellent heat resistance, tensile properties, weatherability, flexibility and elasticity.

As specific examples of the thermoplastic elastomers mentioned above, there are disclosed, for example, in Japanese Patent Publn. No. 34210/1978, thermoplastic elastomers obtained by dynamically partially curing a mixture comprising 60–80 parts by weight of a monoolefin copolymer rubber and 40–20 parts by weight of a polyolefin resin. Further, Japanese Patent Publn. No. 21021/1978 discloses thermoplastic elastomers comprising (a) partially crosslinked copolymer rubber containing ethylene/propylene/non-conjugated polyene copolymer rubber having a gel content of from 30–90% by weight, and (b) a polyolefin resin. Furthermore, Japanese Patent Publn. No. 18448/1980 discloses thermoplastic elastomers obtained by dynamically cross-linking an ethylene/propylene copolymer and a polyolefin resin, either partially or completely.

Sheets of the above-mentioned thermoplastic elastomers have heretofore been used as outer skin materials for automotive internal trim and parts such as instrument panels and interior sheets, after being bonded to or fusion intergrated with core materials, such as acrylonitrile/butadiene/styrene (ABS), polypropylene, aluminum and iron.

However, such sheets of the thermoplastic elastomers as mentioned above were found to be poor in softness to the touch as outer skins.

With a view to solving the above-mentioned problem, such sheets of the thermoplastic elastomers used as outer skin materials were laminated on the back thereof with a polyethylene foam, polypropylene foam or urethane foam so that the cellular body will act as a pad, thereby imparting a soft touch to the sheets.

However, molded articles of foam backed thermoplastic elastomer sheets obtained by fabrication, such as by a vacuum forming technique, were lacking in sharpness of the shape and ridge thereof, though the polyethylene, polypropylene or urethane foam having an expansion coefficient as large as 10–30 times was capable of imparting a soft touch to the thermoplastic elastomer sheets used as outer skin materials. In addition thereto, these foams, as mentioned above, are relatively expensive.

OBJECT OF THE INVENTION

The present invention is intended to solve the problems associated with the prior art as mentioned above and therefore, an object of the invention is to provide a process for preparing thermoplastic elastomer laminates having a thin foam layer, at a moderate cost, the thermoplastic elastomer laminates capable of being molded into shaped articles excellent in sharpness as to shape and ridge and also being soft to the touch by fabrication such as vacuum forming or comparison molding techniques.

It has now been found that when a core material laminated with a thermoplastic elastomer sheet of a specific composition provided on the back thereof with a thin elastomer foam of a specific composition are formed by a vacuum forming technique or the like to integrate them together, a molded article soft to the touch having a sharp shape, and a sharp ridge can be obtained.

SUMMARY OF THE INVENTION

The process for preparing a thermoplastic elastomer laminate of the present invention is characterized by including the steps of laminating a thermoplastic elastomer sheet comprising a polyolefin resin and an ethylene/α-olefin copolymer rubber and a thermoplastic elastomer foamable sheet comprising a polyolefin resin, an ethylene/α-olefin copolymer rubber and a foaming agent, followed by thermal fusion bonding, and thereafter, obtaining an expanded thermoplastic elastomer laminate having the foam layer by heating the laminated sheet, thereby foaming the thermoplastic elastomer foamable sheet.

DETAILED DESCRIPTION OF THE INVENTION

The process for preparing the thermoplastic elastomer laminates of the present invention is illustrated below in detail.

In the first step of the process of the present invention, a thermoplastic elastomer foamable sheet comprising a polyolefin resin, an ethylene/α-olefin copolymer rubber and a foaming agent is placed on the back of a thermoplastic elastomer sheet comprising a polyolefin resin and an ethylene/α-olefin copolymer rubber, and fusion bonding both sheets to each other to obtain a single laminated sheet. It is desirable that the two sheets are thermal fusion bonded to each other so that the foamable sheet is not substantially foamed.

The thermoplastic elastomer constituting the thermoplastic elastomer sheet used in the present invention contains as essential components a polyolefin resin and an ethylene/α-olefin copolymer rubber.

In the present invention, useful as the above-mentioned ethylene/α-olefin copolymer rubber is a partially crosslinked product of ethylene/α-olefin copolymer rubber.

Examples of the thermoplastic elastomer which can be used herein include such thermoplastic resin compositions as will be mentioned below:

(I) Thermoplastic resin compositions obtained by mixing various polyolefin resins represented by homopolymer of ethylene or propylene or copolymers thereof with small amounts of other polymeric monomers with partially crosslinked products of binary copolymer rubber comprising ethylene and α-olefin of 3–14 carbon atoms or ethylene/α-olefin copolymer rubber which is ternary or quaternary copolymer rubber obtained by copolymerizing the binary copolymer rubber with other various polyene compounds (see, for example, Japanese Patent Publn. No. 21021/1978 and Japanese Patent L-O-P Publn. No. 71738/1980);

(II) Thermoplastic resin compositions obtained by heat treating dynamically in the presence of small amounts of cross linking agents a blend of polyolefin resin and ethylene/α-olefin copolymer rubber (see, for example, Japanese Patent Publn. No. 34210/1978, Japanese Patent L-O-P Publns. No.149240/1978 and 149241/1978);

(III) Thermoplastic resin compositions obtained by blending the above-mentioned (I) or (II) further a polyolefin resin (see, for example, Japanese Patent L-O-P Publns. Nos. 145857/1978 and 16554/1979);

(IV) Thermoplastic resin compositions obtained by heat treating dynamically, in the presence of small amounts of peroxides, a blend comprising a peroxide crosslinkable type polyolefin resin represented by a homopolymer of ethylene or copolymer thereof with small amounts of other polymeric monomers, peroxide non-crosslinkable polyolefin resin represented by a homopolymer of propylene or copolymer thereof with small amounts of other polymeric monomers, and ethylene/α-olefin copolymer rubber (see, for example, Japanese Patent L-O-P Publn. No. 71739/1980).

In these thermoplastic elastomers as illustrated above, the polyolefin resin and ethylene/α-olefin copolymer rubber are used in a weight ratio of usually 90/10 to 10/90, preferably 80/20 to 20/80.

As the polyolefin resin used in above cases, there may be used a mixture of polyethylene particularly low density polyethylene and polypropylene in a weight ratio of 10/90 to 70/30 for the purpose of improving moldability and scratch resistance.

From the standpoint of strength, it is desirable to use the ethylene/α-olefin copolymer rubber having an ethylene/α-olefin mole ratio of 50/50 to 90/10, preferably 70/30 to 85/15 and a Mooney viscosity $ML_{1+4}$ (121° C.) of at least about 20, preferably about 40–80. It is desirable that such ethylene/α-olefin copolymer rubber is partially crosslinked by a dynamic heat treatment using generally about 0.1–2 parts by weight of an organic peroxide based on 100 parts by weight of the thermoplastic elastomer.

The thermoplastic elastomer used in the present invention may contain in the above-mentioned thermoplastic resin composition, if necessary, a peroxide non-crosslinking type hydrocarbon rubbery substance represented by polyisobutylene, butyl rubber and the like and/or a mineral oil type softening agent.

In the present invention, the above-mentioned thermoplastic elastomer sheet is formed usually by T-die extrusion, calendering or the like forming technique.

The thermoplastic elastomer sheet used in the present invention has a thickness of usually 0.05–5.0 mm, preferably 0.1–3.0 mm.

The thermoplastic elastomer constituting the thermoplastic elastomer foamable sheet used in the present invention contains as an essential component a foaming agent in addition to the thermoplastic elastomer. The thermoplastic elastomer component constituting the thermoplastic elastomer foamable sheet, from which the foaming agent has been excluded, may be the same as or different from the thermoplastic elastomer component constituting the above-mentioned thermoplastic elastomer sheet.

Specific examples of the foaming agent used in the invention include inorganic foaming agents such as sodium hydrogencarbonate, sodium carbonate, ammonium hydrogen carbonate, ammonium carbonate, ammonium nitrite, etc.; nitroso compounds such as N,N'-dimethyl-N,N'-dinitrosoterephthalamide, N,N'-dinitrosopentamethylene tetramine, etc.; azo compounds such as azodicarbonamide, azobisisobutyronitrile, azocyclohexylnitrile, azodiaminobenzene, barium azodicarboxylate, etc.; sulfonyl hydrazide compounds such as benzensulfonyl hydrazide, toluenesulfonyl hydrazide, p,p'-oxybis(benzenesulfonylhydrazide), diphenylsulfone-3,3'-disulfonylhydrazide, etc.; and azide compounds such as calcium azide, 4,4'-diphenyldisulfonyl azide, p-toluenesulfonyl azide, etc. Of these compounds as exemplified above, preferred is azodicarbonamide.

In the present invention, the proportion of the foaming agent contained in the thermoplastic elastomer foamable sheet is 0.1–50% by weight, preferably 0.5–20% by weight.

The thermoplastic elastomer formable sheet used in the invention is usually formed by T-die extrusion, calendering or the like forming technique.

The above-mentioned thermoplastic elastomer foamable sheet has a thickness of usually from 0.05–5.0 mm, preferably 0.1–3.0 mm.

In the present invention, a laminated sheet is obtained by thermal fusion bonding the thermoplastic elastomer sheet, on the back of the thermoplastic elastomer foamable sheet, under such conditions such that the foamable sheet does not foam. Usually in obtaining the laminated sheet, the thermoplastic elastomer sheet and the thermoplastic elastomer foamable sheet are individually brought to a molten state by heating at about 150°–250° C. using infrared radiation, and then both sheets are contact bonded to each other by using a hot roll kept at a temperature of about 30°–100° C.

Subsequently, in the second step of the process of the present invention, the above-mentioned laminated sheet is heated to expand the thermoplastic elastomer foamable sheet layer, thereby obtaining a thermoplastic elastomer laminate having a foamed layer. In this case, the laminated sheet is preferably heated in an air oven, but other suitable heating means may also be utilized.

The conditions under which the above-mentioned laminated sheet is heated, though the conditions may vary according to the kind of foaming agent used, are such that the temperature employed is usually about 160°–260° C., preferably 170°–250° C. and the heating time is about 0.5–10 minutes, preferably 2–5 minutes.

In the present invention, an expansion coefficient of the foamable layer mentioned above is usually 1.1–20 times, preferably 1.1–8 times and particularly 1.2–5 times, and a thickness of the foamable layer is usually 0.1–10 mm, preferably 0.2–5 mm.

The thermoplastic elastomer laminate obtained in the present invention and a core material are integrated with each other by fabrication such as vacuum forming, hot press or compression molding technique, whereby a molded article soft to the touch which is sharp in shape and ridge is obtained.

The core material to be laminated, if necessary, to the thermoplastic elastomer laminate prepared according to the present invention includes a metallic plate, resin felt, paper, cloth, wood, glass or concrete in addition to the following thermoplastic resin.

The above-mentioned thermoplastic resin includes such resins, regardless of crystallinity or non-crystallinity, for example, polyolefins or ethylene/acrylic acid copolymers such as low density polyethylene, high density polyethylene, polypropylene, poly-1-butene, poly-4-methyl-1-pentene, or random or block copolymers of a-olefins such as ethylene, propylene, 1-butene and 4-methyl-1-pentene; ethylene/vinyl compound copolymers such as ethylene/vinyl acetate copolymers, ethylene/vinyl alcohol copolymers, ethylene/vinyl chloride copolymers, etc.; styrene resins such as polystyrene, acrylonitrole/styrene copolymers, ABS, methyl methacrylate/styrene copolymers, a-methylstyrene/styrene copolymers, etc.; polyacrylic acid esters such as polyvinyl chloride, polyvinylidene chloride, vinyl chloride/vinylidene chloride copolymers, methyl polymethacrylate, etc.; polyamides such as nylon 6, nylon 6/6, nylon 6/10, nylon 11, nylon 12, etc.; thermoplastic polyesters such as polyethylene terephthalate, polybutylene terephthalate, etc.; polycarbonates and polyphenylene oxides or mixtures thereof; or silicone or urethane type resins.

The process of the present invention has such an effect that a relatively inexpensive thermoplastic elastomer laminate having a thin foamed layer is obtained, from which a molded article sharp in shape and ridge and soft to the touch can be obtained when the thermoplastic elastomer laminate is fabricated by such means as vacuum forming or compression molding technique.

The thermoplastic elastomer laminate is integrated, if necessary, with a core material, and the resulting laminate can be used for various applications, for example, automotive internal trim and parts such as instrument panel, interior sheets, etc. and outer skin materials for air bag.

PREFERRED EMBODIMENTS

The present invention is described below with reference to the accompanying examples, which are intended to illustrate, but not limit, certain preferred embodiments of the invention.

EXAMPLE 1

First, pellets of two kinds of thermoplastic elastomers, hereinafter called "TPE (A)" and "TPE (B)" respectively, were prepared in the following manner.

Preparation of Pellets of TPE (A)

A mixture comprising (i) 45 parts by weight of isotactic polypropylene resin [melt flow rate: 13 g/10 min (230° C.)], (ii) 55 parts by weight of ethylene/propylene/ethylidene norbornen terpolymer [ethylene unit/propylene unit (mole ratio): 78/22, iodine value: 15, Mooney viscosity MLI+4 (121° C.): 61], and (iii) 30 parts by weight of naphthene process oil was kneaded at 180° C. for 5 minutes in a nitrogen atmosphere using a Banbury mixer, and the kneadate obtained was then formed with a sheet cutter into square pellets.

Subsequently, 100 parts by weight of the thus obtained square pellets and (iv) 1 part by weight of a mixture comprising 20% by weight of 1,3-bis(tert-butylperoxyisopropyl)benzene, 30% by weight of divinylbenzene and 50% by weight of paraffin mineral oil were kneaded together using a Henschel mixer and then extruded at 220° C. in a nitrogen atmosphere using an extruder to prepare pellets of the thermoplastic elastomer TPE (A).

Preparation of Pellets of TPE (B)

Pellets of the thermoplastic elastomer "TPE (B)" were prepared by repeating the same procedure as in the preparation of pellets of TPE (A) mentioned above except that (i) the amount of the isotactic polypropylene used was changed to 25 parts by weight, (ii) the amount of the ethylene/propylene/ethylidene norbornene terpolymer used was changed to 75 parts by weight, and further (v) 25 parts by weight of butyl rubber (a product of Esso, IIR 065) was added.

Separately, a sheet as an outer skin material for a laminated sheet was prepared from the above-mentioned TPE (A) and an unexpanded sheet for the laminated sheet was prepared from TPE (B), respectively in the following manner.

Preparation of TPE (A) Sheet

The pellets of TPE (A) prepared above were extruded into a sheet-like form of 0.3 mm in thickness by using a 90 mm T-die extrusion molding machine manufactured and sold by Toshiba under such conditions that the screw used was full flight, L/D was 22, the extrusion temperature employed was 220° C., T-die used was a coat hanger die and the take-off speed employed was 5 m/min, and the sheet-like form thus obtained was cooled by means of a cooling roll (roll temperature 35° C.) to prepare the title sheet.

Preparation of TPE (B) Unexpanded Sheet

A mixture comprising 100 parts by weight of the pellets of TPE (B) prepared above, 2.0 parts by weight of azodicarbonamide (ADCA) as a forming agent, and 0.1 part by weight of triallylisocyanurate (TAIC) was kneaded by means of a Henschel mixer, and then from the resulting mixture, TPE (B) unexpanded sheet was prepared according to the procedure employed in the preparation of the above-mentioned TPE (A) sheet, provided that the extrusion temperature employed was 180° C. and the thickness of the sheet was 0.5 mm.

Subsequently, the above-mentioned TPE (A) sheet was laminated to the above-mentioned TPE (B) unexpanded sheet in the following manner by using a laminator to prepare a laminated sheet.

Preparation of Laminated Sheet

The above-mentioned TPE (A) sheet and TPE (B) unexpanded sheet were individually preheated to 180° C. by means of a preheater provided in the laminator, and thereafter both sheets are heat bonded to each other at a take-off speed of 5 m/min by means of two hot rolls and one cooling roll to obtain a laminated sheet.

Finally, the laminated sheet thus obtained was heated in the following manner to obtain a thermoplastic elastomer laminate having a foamed layer.

Preparation of Thermoplastic Elastomer Laminate

The above-mentioned laminated sheet was allowed to stand in an air oven at 240° C. for 4 minutes to expand the TPE (B) unexpanded sheet layer of said laminated sheet, whereby a thermoplastic elastomer laminate of 1.3 mm in thickness was obtained.

The outer skin layer and foamed layer constituting the thus obtained thermoplastic elastomer laminate had a thickness of 0.3 mm and of 1.0 mm, respectively. The thermoplastic elastomer laminate was evaluated with respect to tensile characteristics, surface hardness, torsion modulus, permanent elongation, heat aging characteristics and soft touch in the following manner. The evaluation sample was collected from the above-mentioned laminate by die-punching.

| [Evaluation method] | |
|---|---|
| Tensile characteristics | Evaluated in accordance with JIS K 6301. |
| Surface hardness | Evaluated in accordance with JIS A type of JIS K 6301. |
| Torsion modulus | Evaluated in accordance with ASTM 1043. |
| Permanent elongation | Evaluated in accordance with JIS K 6301. |
| Heat aging characteristics | Evaluated in accordance with Tensile Test Method stipulated in JIS K 6301, using the evaluation sample allowed to stand at 120° C. for 1,000 hours. |
| Soft touch | Evaluated according to the following five-point ratings. 5 . . . Very soft 4 . . . Soft 3 . . . Ordinary 2 . . . Hard 1 . . . Very hard |

Results obtained in the above evaluation are shown in Table 1.

COMPARATIVE EXAMPLE 1

An unexpanded laminated sheet obtained in the same procedure as in Example 1 was evaluated according to the same evaluation method as in Example 1.

Results obtained in the above evaluation are shown in Table 1.

EXAMPLE 2

A laminate was obtained by repeating the same procedure as in Example 1 except that the amount of azodicarbonamide used in the preparation of the TPE (B) unexpanded sheet was changed to 1.5 parts by weight. The laminate obtained was evaluated according to the same evaluation method as in Example 1.

Results obtained in the above evaluation are shown in Table 1.

EXAMPLE 3

A laminate was obtained by repeating the same procedure as in Example 1 except that the amount of azodicarbonamide used in the preparation of the TPE (B) unexpanded sheet was changed to 3.0 parts by weight. The laminate obtained was evaluated according to the same evaluation method as in Example 1.

Results obtained in the above evaluation are shown in Table 1.

EXAMPLE 4

A laminate was obtained by repeating the same procedure as in Example 1 except that the TPE (A) sheet and TPE (B) unexpanded sheet were prepared by calender forming under the conditions as mentioned below. The laminate obtained was then evaluated according to the same evaluation method as in Example 1.

The conditions under which the TPE (A) sheet and TPE (B) unexpanded sheet were formed respectively were the same. That is, both sheets were prepared by using a calendering machine manufactured and sold by Nippon Roll K.K. at a resin temperature of 180° C. and a take-off speed of 20 m/min.

Results obtained in the above evaluation are shown in Table 1.

EXAMPLE 5

A laminate was obtained by repeating the same procedure as in Example 4 except that the amount of the foaming agent azodicarbonamide used was changed to 3.0 parts by weight. The laminate obtained was evaluated according to the same evaluation method as in Example 1.

Results obtained in the above evaluation are shown in Table 1.

EXAMPLES 6–8

Laminates were obtained respectively by repeating the same procedure as in Example 1 except that in place of 100 parts by weight of the TPE (B) used in the preparation of the TPE (B) unexpanded sheet, there were used TPE (B) and linear low density polyethylene (LLDPE) in the proportion (weight ratio) as mentioned below. The laminates obtained were evaluated according to the same evaluation method as in Example 1:

Example 6: TPE (B)/LLDPE=95/5

Example 7: TPE (B)/LLDPE=90/10

Example 8: TPE (B)/LLDPE=80/20

Results obtained in the above evaluation are shown in Table 1.

TABLE 1

| | Example 1 | Compar. Ex. 1 | Example 2 | Example 3 | Example 4 | Example 5 | Example 6 | Example 7 | Example 8 |
|---|---|---|---|---|---|---|---|---|---|
| TPE(B)/LLDPE [wt part] | 100/0 | 100/0 | 100/0 | 100/0 | 100/0 | 100/0 | 95/5 | 90/10 | 80/20 |
| Amount of foaming agent [wt part] | 2.0 | 2.0 | 1.5 | 3.0 | 2.0 | 3.0 | 2.0 | 2.0 | 2.0 |
| Forming Process of the sheet | T-die | T-die | T-die | T-die | Calender | Calender | T-die | T-die | T-die |
| Coefficient of epansion [time] | 2.0 | 0 | 1.5 | 3.0 | 2.0 | 3.0 | 2.0 | 2.0 | 2.0 |
| Tensile strength: | | | | | | | | | |
| $M_{100}$ [kg/cm$^2$] | 15 | 40 | 30 | 10 | 15 | 10 | 15 | 20 | 25 |
| $T_3$ [kg/cm$^2$] | 90 | 125 | 100 | 50 | 80 | 40 | 80 | 90 | 100 |
| $E_3$ [%] | 700 | 750 | 730 | 400 | 700 | 450 | 700 | 710 | 780 |
| Surface hardness (JIS A type) | 50 | 60 | 60 | 50 | 50 | 50 | 65 | 65 | 70 |

TABLE 1-continued

|  | Example 1 | Compar. Ex. 1 | Example 2 | Example 3 | Example 4 | Example 5 | Example 6 | Example 7 | Example 8 |
|---|---|---|---|---|---|---|---|---|---|
| Torsion modulus [kg/cm$^2$] | 10 | 20 | 15 | 10 | 20 | 10 | 25 | 30 | 35 |
| Parmanent elongation [%] | 10 | 20 | 20 | 25 | 20 | 25 | 30 | 30 | 30 |
| Heat aging elongation [%] | 650 | 700 | 700 | 250 | 600 | 200 | 680 | 700 | 750 |
| Soft touch | 5 | 1 | 3 | 5 | 4 | 5 | 4 | 4 | 4 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for preparing a two layer thermoplastic elastomer laminate having a foamed layer, which consists essentially of the steps of:

dynamically heat treating a blend of a peroxide non-crosslinkable polyolefin resin and an ethylene/α-olefin/non-conjugated diene terpolymer rubber in the presence of a peroxide, thereby partially crosslinking said ethylene/α-olefin/non-conjugated diene terpolymer rubber and forming a first thermoplastic elastomer;

forming said first thermoplastic elastomer into a pre-formed non-foamable sheet consisting essentially of said peroxide non-crosslinkable polyolefin resin and said ethylene/α-olefin/non-conjugated diene terpolymer rubber within the range of weight ratios from 80/20 to 20/80;

dynamically heat treating a blend of a peroxide non-crosslinkable polyolefin resin and an ethylene/α-olefin/non-conjugated diene terpolymer rubber in the presence of a peroxide, thereby partially crosslinking said ethylene/α-olefin/non-conjugated diene terpolymer rubber and forming a second thermoplastic elastomer;

forming said second thermoplastic elastomer into a foamable sheet consisting essentially of said peroxide non-crosslinkable polyolefin resin and said ethylene/α-olefin/non-conjugated diene terpolymer rubber within the range of weight ratios from 80/20 to 20/80, and containing a foaming agent;

laminating said pre-formed non-foamable sheet by thermal fusion bonding, with said pre-formed foamable sheet to provide a laminated sheet; and heating said laminated sheet to a temperature so as to expand said foamable sheet 1.1 to 20 times to obtain a thermoplastic laminate of said pre-formed non-foamable sheet and a foamed sheet having a thickness of 0.1 to 10 mm.

2. The process as in claim 1 wherein said thermoplastic elastomer non-foamable sheet is bonded in the presence of heat to said thermoplastic elastomer foamable sheet while maintaining said foamable sheet in a substantially unexpanded state.

3. The process as in claim 1, wherein the amount of said foaming agent is from 0.1 to 50% by weight of said thermoplastic elastomer.

4. The process as in claim 1, wherein said polyolefin resin is a mixture of polyethylene and polypropylene in a weight ratio of 10/90 to 70/30.

5. The process in claim 1, wherein said ethylene/α-olefin/non-conjugated diene terpolymer has an ethylene/α-olefin mole ratio of 50/50 to 90/10 and a Mooney viscosity $ML_{1+4}$ (121° C.) of at least about 20.

6. The process as in claim 1, wherein said crosslinking agent is an organic peroxide of about 0.1–2 parts by weight of said thermoplastic elastomer.

7. The process as in claim 1, wherein said lamination is carried out by using a hot roll.

8. A process for preparing a three layer thermoplastic elastomer laminate having a core material and foamed layer integrated thereon, which consists essentially of the steps of:

dynamically heat treating a blend of a peroxide non-crosslinkable polyolefin and an ethylene/α-olefin/non-conjugated diene terpolymer rubber in the presence of a peroxide, thereby partially crosslinking said ethylene/α-olefin/non-conjugated diene terpolymer rubber and forming a first thermoplastic elastomer;

forming said first thermoplastic elastomer into a pre-formed non-foamable sheet consisting essentially of said peroxide non-crosslinkable polyolefin resin and said ethylene/α-olefin/non-conjugated diene terpolymer rubber within the range of weight ratios from 80/20 to 20/80;

dynamically heat treating a blend of a peroxide non-crosslinkable polyolefin and an ethylene/α-olefin/non-conjugated diene terpolymer rubber in the presence of a peroxide, thereby partially crosslinking said ethylene/α-olefin/non-conjugated diene terpolymer rubber and forming a second thermoplastic elastomer;

forming said second thermoplastic elastomer into a foamable sheet consisting essentially of said peroxide non-crosslinkable polyolefin resin and said ethylene/α-olefin/non-conjugated diene terpolymer rubber within the range of weight ratios from 80/20 to 20/80, and containing a foaming agent;

laminating said pre-formed non-foamable sheet by thermal fusion bonding, with said pre-formed foamable sheet to provide a laminated sheet; and heating said laminated sheet to a temperature so as to expand said foamable sheet 1.1 to 20 times to obtain a thermoplastic laminate of said per-formed non-foamable sheet and a foamed sheet having a thickness of 0.1 to 10 mm; and integrating said thermoplastic laminate with a core material such that said expanded thermoplastic elastomer foamable sheet serves as an intermediate layer between said non-foamable thermoplastic elastomer sheet and said core material.

9. The process as in claim 8, wherein said thermoplastic elastomer non-foamable sheet is bonded in the presence of heat to said thermoplastic elastomer foamable sheet while maintaining said foamable sheet in a substantially unexpanded state.

10. The process as in claim 8, wherein the amount of said foaming agent is from 0.1 to 50% by weight of said thermoplastic elastomer.

11. The process as in claim 8, wherein said polyolefin resin is a mixture of polyethylene and polypropylene in a weight ratio of 10/90 to 70/30.

12. The process in claim 8, wherein said ethylene/α-olefin/non-conjugated diene terpolymer has an ethylene/α- olefin mole ratio of 50/50 to 90/10 and a Mooney viscosity $ML_{1+4}$ (121° C.) of at least about 20.

13. The process as in claim 8, wherein said crosslinking agent is an organic peroxide of about 0.1–2 parts by weight of said thermoplastic elastomer.

14. The process as in claim 8, wherein said lamination is carried out by using a hot roll.

15. The process as in claim 8, wherein said core material is selected from the group consisting of a metallic plate, resin felt thermoplastic resin, paper, cloth, wood, glass and concrete.

* * * * *